United States Patent
Zhou (10) Patent No.: US 11,775,270 B1
(45) Date of Patent: Oct. 3, 2023

(54) METHOD AND APPARATUS FOR PARSING STRUCTURED PARAMETERS OF GEOCOMPUTATION LANGUAGE, DEVICE AND MEDIUM

(71) Applicant: Tsinghua University, Beijing (CN)

(72) Inventor: Wensheng Zhou, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/303,018

(22) Filed: Apr. 19, 2023

(51) Int. Cl.
*G06F 9/44* (2018.01)
*G06F 8/41* (2018.01)
*G06F 8/30* (2018.01)

(52) U.S. Cl.
CPC ............... *G06F 8/427* (2013.01); *G06F 8/31* (2013.01)

(58) Field of Classification Search
CPC ...................................................... G06F 8/427
USPC ...................................................... 717/143
See application file for complete search history.

(56) References Cited

U.S. PATENT DOCUMENTS

| | | | |
|---|---|---|---|
| 7,353,114 B1 * | 4/2008 | Rohlf | G06F 40/143 702/5 |
| 8,977,521 B2 * | 3/2015 | Angevine | G06F 30/00 703/1 |
| 9,684,544 B1 | 6/2017 | Bequet et al. | |
| 9,767,354 B2 * | 9/2017 | Thompson | H04N 1/40062 |
| 11,074,265 B2 * | 7/2021 | Baskinger | G06F 16/24553 |
| 2013/0031113 A1 | 1/2013 | Feng et al. | |
| 2015/0120274 A1 * | 4/2015 | Forbush | G06F 40/58 704/2 |
| 2017/0011065 A1 * | 1/2017 | Mall | G06F 16/29 |
| 2018/0314962 A1 * | 11/2018 | Monson | G06N 20/00 |
| 2021/0374521 A1 * | 12/2021 | Albeshri | G01V 99/005 |

FOREIGN PATENT DOCUMENTS

| | | | | |
|---|---|---|---|---|
| CN | 110019969 A | * | 7/2019 | ....... G06F 17/30917 |
| CN | 110334169 A | * | 10/2019 | ............. G06F 16/29 |
| CN | 110334169 A | | 10/2019 | |
| CN | 110377291 A | | 10/2019 | |
| CN | 111381935 A | | 7/2020 | |

(Continued)

OTHER PUBLICATIONS

Zhou, W. (2021). GeoComputation Language. In: A New GeoComputation Pattern and Its Application in Dual-Evaluation. Springer, Singapore. https://doi.org/10.1007/978-981-33-6432-5_4.*

(Continued)

*Primary Examiner* — Francisco J Aponte
(74) *Attorney, Agent, or Firm* — Emerson Thomson Bennett; Daniel A. Thomson (57) ABSTRACT

The embodiments of the present disclosure relate to the technical field of GeoComputation, and particularly relates to a method and an apparatus for parsing structured parameters of a GeoComputation language, a device and a storage medium, which aim to parse structured expressions in a DAS document. The method includes: reading GeoComputation task parameters in a DAS document; parsing a structured expression in the GeoComputation task parameters to obtain a task parameter containing a basic expression; and executing a corresponding GeoComputation task according to the task parameter containing the basic expression to obtain a calculation result.

5 Claims, 1 Drawing Sheet

(56) References Cited

FOREIGN PATENT DOCUMENTS

CN 115965227 A * 4/2023
JP 2011065582 A 3/2011

OTHER PUBLICATIONS

Zhiwei Cao; "Improving the Accuracy and the Efficiency of Geo-Processing through a Combinative Geo-Computation Approach"; Department of Civil, Environmental and Geomatic Engineering, University College London—Jan. 2016.*
Fan, Peng; First Office Action and Search Report regarding CN202210498166.5; dated Nov. 20, 2022; 9 pages.
Supplemental Search Report regarding CN202210498166.5; dated Jan. 2, 2023; 2 pages.
Zhou Wensheng; 1994-2022 China Academic Journal Electronic Publishing House; "Application of Geodesign Based on DAS in Special Planning"; 11 pages.

* cited by examiner

METHOD AND APPARATUS FOR PARSING STRUCTURED PARAMETERS OF GEOCOMPUTATION LANGUAGE, DEVICE AND MEDIUM

TECHNICAL FIELD

The embodiment of the present disclosure relates to the technical field of GeoComputation and, more particularly, to a method and an apparatus for parsing structured parameters of a GeoComputation language, a device and a medium.

BACKGROUND

"Document as a system" (DAS) is a fire-new GeoComputation pattern. This technology uses the GeoComputation language (G language) to describe geographic analysis models in MS word or Kingsoft WPS document and forms a DAS intelligent document, and then the DAS intelligent document drives a background GIS system (such as ArcGIS, QGIS) to complete the GeoComputation, which greatly reduces the technical threshold of GIS disclosure and improves the efficiency of a GIS disclosure system development. Currently, a development platform DAS 2019 integrated the G language has been developed, and a series of DAS disclosure systems are constructed based on the platform. In 2021, this achievement won the Gold Award at the 48$^{th}$ International Exhibition of Inventions of Geneva, and was enrolled in the "World Leading Internet Scientific and Technological Achievements" at the 2021 World Internet Conference. When constructing a geographic analysis model using the G language, user needs to enter some parameters into the DAS document. For example, the input objects (layers or data tables) in the "Input and Control Table", the input objects, output objects, and control parameters for some keywords in the "Calculation Process Table" need to be listed one by one, and the parameters should be input into the corresponding columns for subsequent calculations.

However, when the GeoComputation model is complex, such expression, on one hand, may lead to too much redundant information, which not only takes up a lot of table space, but also makes it difficult for users to understand the logic expressed in the document. On the other hand, the users need to repeatedly input parameters with similar structures, which is inefficient, prone to errors, and is not conducive to later modification and maintenance.

SUMMARY

The embodiments of the present application provide a method and an apparatus for parsing structured parameters of a GeoComputation language, a device and a storage medium, which may parse structured expressions in a DAS document.

An embodiment according to a first aspect of the present application provides a method for parsing structured parameters of a GeoComputation language, wherein the method includes:
reading GeoComputation task parameters in a DAS document;
parsing a structured expression in the GeoComputation task parameters to obtain a task parameter containing a basic expression; and
executing a corresponding GeoComputation task according to the task parameter containing the basic expression to obtain a calculation result.

Optionally, parsing the structured expression in the GeoComputation task parameters to obtain the task parameter containing the basic expression includes:
determining a structural type of the structured expression according to an expression structure of the structured expression;
expanding and restoring the structured expression according to the structural type of the structured expression to obtain a basic expression corresponding to the structured expression; and
replacing the structured expression with the basic expression corresponding to the structured expression in the GeoComputation task parameters to obtain the task parameter containing the basic expression.

Optionally, the structural type of the structured expression includes an enumeration expression, a list expression, a grouping expression, and a grouping mixed expression.

Optionally, determining the structural type of the structured expression according to the expression structure of the structured expression includes:
when it is detected that the expression structure of the structured expression is A[item1; item2; . . . ]B, determining that a type of the structured expression is the enumeration expression, wherein A and B are character strings of a same part in the basic expression corresponding to the structured expression, and item1 and item2 represent numerical values in the basic expression corresponding to the structured expression;
when it is detected that the expression structure of the structured expression is A[item1:item2]B, determining that the type of the structured expression is the list expression, wherein A and B are character strings of the same part in the basic expression corresponding to the structured expression, and item1 and item2 represent numerical values in the basic expression corresponding to the structured expression;
when it is detected that a grouping identifier is present in the structured expression, determining that the type of the structured expression is the grouping expression. The grouping expression is an expression that applies the enumeration expression or list expression to all sub items in the group with the grouping identifier; and
when it is detected that the grouping expression and a fixed identifier are present in the structured expression, determining that the type of the structured expression is the grouping mixed expression, which includes expressions with fixed subitems in the grouping expression.

Optionally, expanding and restoring the structured expression according to the structural type of the structured expression to obtain the basic expression corresponding to the structured expression includes:
when a type of the structured expression is an enumeration expression, expanding all sub-items displayed in the structured expression one by one to obtain the basic expression corresponding to the structured expression;
when the type of the structured expression is a list expression, expanding all sub-items displayed in the structured expression and intermediate sub-items of all the sub-items one by one to obtain the basic expression corresponding to the structured expression;
when the type of the structured expression is a grouping expression, expanding grouping items in the structured expression according to a corresponding rule, and replacing the grouping identifier in the structured expression with a corresponding sub-item to obtain the basic expression corresponding to the structured expression; and when the type of the structured expression is a grouping mixed expression, expanding the grouping items in the structured expression according to a corresponding rule, and keeping fixed sub-items in the structured expression unchanged to obtain the basic expression corresponding to the structured expression.

An embodiment according to a second aspect of the present application provides an apparatus for parsing structured parameters of a GeoComputation language, wherein the apparatus includes:

a data reading module, configured for reading GeoComputation task parameters in a DAS document;

a data parsing module, configured for parsing a structured expression in the GeoComputation task parameters to obtain a task parameter containing a basic expression; and a GeoComputation module, configured for executing a corresponding GeoComputation task according to the task parameter containing the basic expression to obtain a calculation result.

Optionally, the data parsing module includes:

a structural type determining sub-module, configured for determining a structural type of the structured expression according to an expression structure of the structured expression;

an expression expanding sub-module, configured for expanding and restoring the structured expression according to the structural type of the structured expression to obtain a basic expression corresponding to the structured expression;

a parameter obtaining sub-module, configured for replacing the structured expression with the basic expression corresponding to the structured expression in the GeoComputation task parameters to obtain the task parameter containing the basic expression.

Optionally, the structural type of the structured expression includes an enumeration expression, a list expression, a grouping expression, and a grouping mixed expression.

Optionally, the structural type determining sub-module includes:

an enumeration expression determination sub-module is configured for determining the type of the structured expression as an enumeration expression when the expression structure of the structured expression is detected as A[item1; item 2; . . . ]B, wherein A and B are character strings of a same part in the basic expression corresponding to the structured expression, and item1 and item2 represent numerical values or character strings in the basic expression corresponding to the structured expression;

a list expression determination sub-module is configured for determining the type of the structured expression as a list expression when it is detected that the expression structure of the structured expression is A[item1: item2]B, wherein A and B are character strings of the same part in the basic expression corresponding to the structured expression, and item1 and item2 represent numerical values in the basic expression corresponding to the structured expression;

a grouping expression determination sub-module is configured for determining the type of the structured expression as a grouping expression when a grouping identifier is detected in the structured expression. The grouping expression is an expression that applies the enumeration expression or list expression to all sub items in the group through the grouping identifier; and a grouping mixed expression determination sub-module is configured for determining the type of the structured expression as a grouping mixed expression when it is detected that there is a grouping expression in the structured expression and a fixed identifier exists. The grouping mixed expression includes an expression with a fixed sub-term in the grouping expression.

Optionally, the expression expanding sub-module includes:

an enumerative expression expansion sub-module is configured for expanding all the sub items displayed in the structured expression one by one when the type of the structured expression is an enumerative expression, and obtaining the basic expression corresponding to the structured expression;

a list expression expansion sub-module is configured for expanding all the sub items displayed in the structured expression and the intermediate sub-items of all sub-items one by one when the type of the structured expression is a list expression, and obtaining the basic expression corresponding to the structured expression;

a grouping expression expansion sub-module is configured for expanding the grouping items in the structured expression according to corresponding rules when the type of the structured expression is a grouping expression, and replacing the grouping identifier in the structured expression with the corresponding sub-items to obtain the basic expression corresponding to the structured expression; and a group mixed expression expansion sub-module is configured for expanding the group items in the structured expression according to corresponding rules when the type of the structured expression is a group mixed expression, and keeping the fixed sub-items in the structured expression unchanged to obtain the basic expression corresponding to the structured expression.

An embodiment according to a second aspect of the present application provides a readable storage medium on which a computer program is stored. When the computer program is executed by a processor, the steps in the structured parameter parsing method of the GeoComputation language as described in the first aspect of the present disclosure are implemented.

An embodiment according to a fourth aspect of the present disclosure provides an electronic device including a memory, a processor, and a computer program stored in the memory and being capable of running on the processor, wherein the processor, when executing the computer program, implements the steps of the method for parsing the structured parameters of the GeoComputation language according to the first aspect of the present disclosure.

The structured parameter parsing method for the GeoComputation language provided by the present disclosure is adopted to read the GeoComputation task parameters in the DAS document; parse the structured expression in the GeoComputation task parameters to obtain the task parameter containing the basic expression; and execute the GeoComputation task according to the task parameter containing the basic expression to obtain the calculation result. In the present disclosure, the structured expression of the G language is preset, and the user can input the GeoComputation task parameters into the DAS document in the form of structured expression. After receiving the GeoComputation task parameters, the DAS document parses the structured expressions in the GeoComputation task parameters, expands and restores the structured expression to the basic expression, and performs GeoComputation according to the basic expression to obtain the calculation result. The system can parse the structured expression, without needing the user to repeatedly input the parameters with similar structures, which reduces the input workload of the user, reduces the probability of the user inputting wrong parameters, makes the parameters in the DAS document concise and clear, reduces the generation of redundant data, facilitates the user to understand the logic of the whole computation process, as well as facilitates the modification and maintenance of the DAS document in the later stage, lowers the use threshold of the G language, and is beneficial to the promotion of the G language.

BRIEF DESCRIPTION OF THE DRAWINGS

In order to explain the technical solution of the embodiments of the present disclosure more clearly, the drawings required in the description of the embodiments of the present disclosure may be briefly introduced below; obviously, the drawings in the following description are some embodiments of the present disclosure, and for those of ordinary skill in the art, other drawings can be obtained according to these drawings without paying creative labor.

DETAILED DESCRIPTION OF THE EMBODIMENTS

The technical solutions of the embodiments of the present disclosure may be clearly and completely described below with reference to the drawings of the embodiments of the present disclosure. Apparently, the described embodiments are merely a part of embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
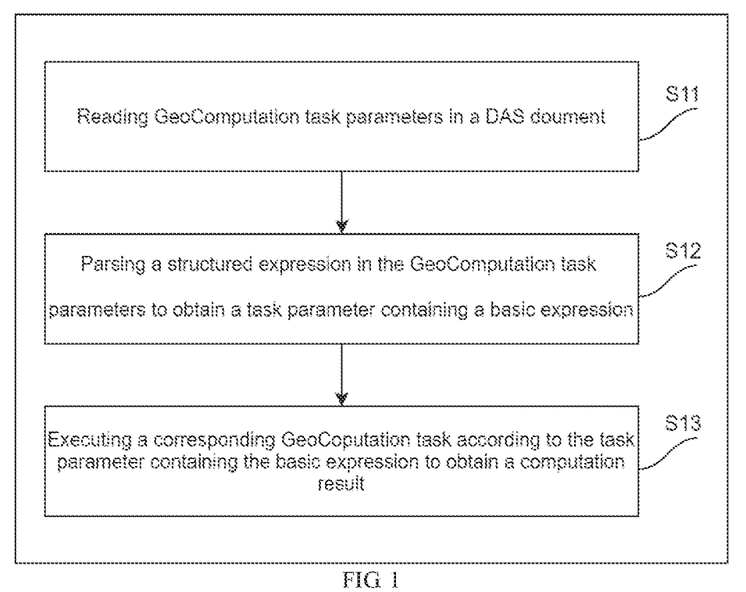
FIG. 1 is a flow chart of a structured parameter parsing method for a GeoComputation language proposed in an embodiment of the present disclosure.

Referring to FIG. 1, FIG. 1 is a flow chart of a structured parameter parsing method for the GeoComputation language proposed by an embodiment of the present disclosure. As shown in FIG. 1, the method includes the following steps:

S11: reading GeoComputation task parameters in a DAS document.

In the present embodiment, one GeoComputation task includes one "input and control table" and one "computation process table".

In the present embodiment, relevant data and specific computation methods needed for GeoComputation are stored in the "input and control table" and the "computation process table". During the geographic calculation, the background of the DAS performs calculation according to relevant parameters in the "input and control table" and the "computation process table".

In the present embodiment, when performing the geographic calculation, firstly, information related to the GeoComputation task in the DAS document is read through background.

For example, referring to table 1, table 1 is an input and control table proposed by an embodiment of the present disclosure. As shown in table 1, rows with serial numbers 3 to 6 listed in the input and control table one by one in sequence are basic sub-items with similar structures, and which are more troublesome to input without using structured expressions.

TABLE 1

| | [Computation Control] | |
|---|---|---|
| Serial No | Layer Name | Physical Layer |
| 1 | [Provinces and cities] | M1/ChinaPTP.shp |
| 2 | [Cities] | M1/CityPTP.shp |
| 3 | [QR20220124] | M2/QR20220124.csv |
| 4 | [QR20220125] | M2/QR20220125.csv |
| 5 | [QR20220126] | M2/QR20220126.csv |
| 6 | [QR20220127] | M2/QR20220127.csv |

Table 2 is a computation process table proposed by an embodiment of the present disclosure. As shown in table 2, there are also a large number of data with similar structures in the four rows of parameters in it, but some serial numbers are different, and parameters in an operation column and an input column are basic sub-items.

TABLE 2

| Step | Operation Instruction | Input | Operation | Output |
|---|---|---|---|---|
| 1 | Acquire migration data | [Provinces and cities] | [Description] Acquire Baidu migration data [M] [Keywords] Name list of target province or city \| Date list\| Move in or out [in or out] List \| Target province or city identification [p or c]- KX BD_GetQx (Beijing\| 20220124 \| in\| province) | [Move in 2022024] QR20220124.csv |
| 2 | Acquire migration data | [Provinces and cities] | [Description] Acquire Baidu migration data [M] [Keywords] Name list of target province or city \| Date list\| Move in or out [in or out] List \| Target province or city identification [p or c]- KX BD_GetQx (Beijing\| 20220124 \| in \| province) | [Move in 2022024] QR20220125.csv |
| 3 | Acquire migration data | [Provinces and cities] | [Description] Acquire Baidu migration data [M] [Keywords] Name list of target province or city \| Date list\| Move in or out [in or out] List \| Target province or city identification [p or c]- KX BD_GetQx (Beijing\| 20220124 \| in \| province) | [Move in 2022024] QR20220126.csv |
| 4 | Acquire migration data | [Provinces and cities] | [Description] Acquire Baidu migration data [M] [Keywords] Name list of target province or city \| Date list\| Move in or out [in or out] list \| target province or city identification [p or c]- KX BD_GetQx (Beijing\| 20220124 \| in \| province) | [Move in 2022024] QR20220127.csv |

The parameters in the above-mentioned input and control table and computation process table are all used in the GeoComputation tasks.

Parsing a structured expression in the GeoComputation task parameters to obtain a task parameter containing a basic expression.

In the present embodiment, in order to simplify input workload of a user, a series of structured expressions in G language are set. When the user inputs data into the DAS document, it is only necessary to input a plurality of basic sub-items in the GeoComputation task parameters into the list of the DAS document according to the form of structured expressions.

After the user inputs the GeoComputation task parameters containing structured expressions into the input and control table and the computation process table in DAS documents, the DAS may drive the background to parse the structured expressions in the parameters, and restore the structured expressions to basic expressions, and facilitate subsequent computation.

In the present embodiment, the specific steps of parsing the structured expression in the GeoComputation task parameters to obtain the task parameter containing the basic expression are as follows:

S12-1: determining a structural type of the structured expression according to an expression structure of the structured expression.

In the present embodiment, the structural types of the structured expression are classified into four types: enumeration expression, list expression, grouping expression, and grouping mixed expression.

In the present embodiment, there are differences in the specific structure and symbols used for each structural type of expression. The background may determine the structural type of the structured expression according to the specific structure and specific symbol of the structured expression in the input parameters. The specific steps include:

S12-1-1: when it is detected that the expression structure of the structured expression is A[item1; item2; . . . ]B, it is determined that the type of the structured expression is an enumeration expression, wherein A and B are character strings of the same part in the basic expression, and item1 and item2 represent numerical values or character strings in the basic expression.

In the present embodiment, the structure of the enumeration expression is A[item1; item2; . . . ]B. Essentially, it extracts the different parts in each sub-item of the original basic expression as a list for expression. Among them, A and B are character strings of the same part in the basic expression, item1 and item2 represent numerical values or character strings in the basic expression, and each sub-item is divided by ";".

In the present embodiment, when the interpreter detects that the structure of the structured expression is A[item1; item2; . . . ]B, it is determined that the type of the structured expression is the enumeration expression.

S12-1-2: when it is detected that the expression structure of the structured expression is A[item1: item2]B, it is determined that the type of the structured expression is a list expression, wherein A and B are character strings of the same part in the basic expression, and item1 and item2 represent numerical values in the basic expression.

In the present embodiment, the structure of the list expression is A [item1; item2]B, which essentially represents continuously changing item* in the form of a list. Among them, A and B are character strings of the same part in the basic expression, and item1 and item2 represent numerical values in the basic expression.

In the present embodiment, when the interpreter detects that the structure of the structured expression is A[item1: item2]B, it is determined that the structured expression is a list expression.

S12-1-3: when a grouping identifier is detected in the structured expression, it is determined that the type of the structured expression is a grouping expression. The grouping expression is an expression in which the enumeration expression or the list expression is applied to all sub-items in the group through the grouping identifier.

In the present embodiment, the grouping expression applies an enumeration type rule or a list type rule to all of the sub-items in the group through the grouping identifier.

Exemplarily, the expression form of the grouping expression is:

A[item1;item2;item3]#B[*]#C[*]#D#E, or

A[item1:item3]#B[*]#C[*]#D#E.

A, B, and C are grouping items, which are written according to list or enumeration rules, D and E are general items, and [*] is the grouping identifier.

In the present embodiment, a plurality of groups are allowed in the grouping expression, such as:

The grouping expression "A[1:3]#B[*]#C[*]#X[1;5]#Y[*]#Z[*]" contains two groups, which are respectively (A, B, C) and (X, Y, Z). The first group is a list expression, and the second group is an enumeration expression.

S12-1-4: when is fixed identifier is detected in the structured expression, it is determined that the type of the structured expression is a grouping mixed expression, which includes expressions with fixed sub-items in the grouping mixed expression.

In the present embodiment, the grouping mixed expression means that the grouping expression contains fixed sub-items, and when the grouping expression contains fixed sub-items, the fixed items are identified by fixed identifiers.

In the present embodiment, when the interpreter detects that the fixed identifier is present in the structured expression, it is determined that the type of the structured expression is a grouping mixed expression.

Exemplarily, the expression form is:

A[item1;item2;item3]#@B[*]#C[*], or

A[item1:item3]#@B[*]#C[*].

A, B, and C are one group, where item B is a fixed sub-item, and the fixed sub-item B is identified by a grouping identifier "@".

S12-2: expanding and restoring the structured expression according to the structural type of the structured expression to obtain a basic expression corresponding to the structured expression.

In the present embodiment, after the structural type of the structured expression is determined, the structured expression is expanded and restored according to the corresponding expansion rules, and the expanded expression obtained is the basic expression corresponding to the structured expression.

In the present embodiment, the specific steps of expanding and restoring the structured expression according to the structural type of the structured expression to obtain the basic expression corresponding to the structured expression are as follows:

S12-2-1: when the type of the structured expression is an enumeration expression, expanding all sub-items displayed in the structured expression one by one to obtain the basic expression corresponding to the structured expression.

In the present embodiment, when it is detected that the type of the structured expression is an enumeration expression, all the sub-items of the structured expression are expanded one by one according to structural characteristics of the enumeration expression, thus obtaining the basic expression corresponding to the structured expression.

In the present embodiment, the enumeration expression in the form of "A[item1; item2; . . . ]B" is expanded and restored to obtain the basic expression in the form of "Aitem1B#Aitem2B# . . . ".

Exemplarily, in a GeoComputation task, if it is detected that the enumeration expression is a "thematic map ([forest land; grassland; cultivated land])", then, its expansion is a thematic map ([forest land; grassland; cultivated land]).

Referring to table 3, table 3 is an input and control table 2 proposed by an embodiment of the present disclosure. As shown in Table 3, in one row corresponding to serial number 1 in the list, parameters of a layer name and a physical layer are enumeration expressions.

TABLE 3

| Serial No | Layer Name | Physical Layer |
| --- | --- | --- |
| 1 | [QR202201[24; 25]] | M2/QR20220124.csv |

Referring to table 4, table 4 is an input and control table 3 proposed by an embodiment of the present disclosure. As shown in Table 4, rows with serial number 1 and serial number 2 in the list are corresponding to the basic expression after expanding the enumeration expression in table 4.

TABLE 4

| Serial No | Layer Name | Physical Layer |
| --- | --- | --- |
| 1 | [QR20220124] | M2/QR20220124.csv |
| 2 | [QR20220125] | M2/QR20220125.csv |

S12-2-2: when the type of the structured expression is a list expression, expanding all sub-items displayed in the structured expression and intermediate sub-items of all the sub-items one by one to obtain the basic expression corresponding to the structured expression.

In the present embodiment, when it is detected that the structured expression is a list expression, all the sub-items displayed in the structured expression and the intermediate sub-items of all the sub-items are expanded one by one according to structural characteristics of the list expression, thus obtaining the corresponding basic expression.

In the present embodiment, there are two situations for the list expression with the expression structure of A[item1: item2]B:

When item1<item2, the basic expression of the A[item1: item2]B is Aitem1B# Aitem1+1B# Aitem1+2B# . . . Aitem2B.

Exemplarily, in a GeoComputation task, the basic expression corresponding to the list expression "thematic map ([1:3])" is "thematic map (1) # thematic map (2) # thematic map (3)".

When item1>item2, the basic expression of the A[item1: item2]B is Aitem1B#Aitem1−1B# Aitem1−2B# . . . Aitem2B.

Exemplarily, in a GeoComputation task, the basic expression corresponding to the list expression "thematic map ([3:1])" is "thematic map (3) # thematic map (2) # thematic map (1)".

item1 and item2 are the sub-items displayed in the list expression, and all the sub-items between item1 and item2 are intermediate sub-items.

Furthermore, a character length of the serial number after expanding the list expression is no less than a character length of item1. For example, a basic expression after expanding a thematic map ([01:3]) is a thematic map (01) # thematic map (02) # thematic map (03).

Referring to table 5, table 5 is an input and control table 4 proposed by an embodiment of the present disclosure. In one row corresponding to serial number 3 in the list, parameters in a layer name and a physical layer are list expressions corresponding the basic expression of data in the rows corresponding to serial number 3 to serial number 6 in table 1.

TABLE 5

| Serial No | Layer Name | Physical Layer |
| --- | --- | --- |
| 1 | [Provinces and cities] | M1/ChinaPTP.shp |
| 2 | [Cities] | M1/CityPTP.shp |
| 3 | [QR202201[24: 27]] | M2/QR20220124.csv |

S12-2-3: when the type of the structured expression is a grouping expression, expanding grouping items in the structured expression according to a corresponding rule, and replacing the grouping identifier in the structured expression with a corresponding sub-item to obtain the basic expression corresponding to the structured expression.

In the present embodiment, when the interpreter detects that the type of the structured expression is a grouping expression, the grouping items in the structured expression are expanded according to a corresponding rule, and the grouping identifier in the structured expression is replaced with the corresponding sub-item. A grouping item with a grouping identifier has the same type and sub-item content as the type and sub-item content of a previous grouping item.

Exemplarily, one grouping expression is "Value [3:6;9] #Rvalue[*]#Sum", which is expanded and restored to be a basic expression:

Value3#Rvalue3#Value6# Rvalue6#Value9# Rvalue9#Sum

Value [3;6;9] and Rvalue[*] are grouping items, Sum is a general item, and the general item does not need to be expanded.

When there are a plurality of groups in the grouping expression, for example, "A[1:3]#B[*]#C[*]#X [1;5]#Y[*] #Z[*]" contains two groups (A,B,C) and (X, Y, Z). The first group is a list expression, and the second group is an enumeration expression. A basic expression corresponding to the expression is:

A1#B1#C1#A2#B2#C2#A3#B3#C3#X1#Y1#Z1#X5# Y5#Z5.

Referring to table 6, table 6 is a computation process table 2 proposed by an embodiment of the present disclosure. As shown in Table 6, an input column in the computation process table is a list expression, and an output column in the table is a grouping expression.

TABLE 6

| Step | Operation Instruction | Input | Operation | Output |
| --- | --- | --- | --- | --- |
| 1 | Field calculation | [T[1:4]] | [Description] Field calculation or attribute connection M [Keyword] List of connection | [TA[1:4]] TA[*].shp |

TABLE 6-continued

| Step | Operation Instruction | Input | Operation | Output |
|------|----------------------|-------|-----------|--------|
|      |                      |       | fields # \| F11 # F12 # . . . , F21#F22 # . . . , [List of calculation expressions ({ *—normalized]FN1 = expr1, . . . (variable [@FSum])\|{normalized} KX_FieldCalculator(FID\| Bus08#Bus12#Car08#Car12\| JB = [F1]/[F2], JC = [F3]/[F4], P = [F1]/[F3]) |        |

Referring to table 7, table 7 is a computation process table 3 proposed by an embodiment of the present disclosure. As shown in Table 7, an input column of the computation process table in table 7 is a basic expression corresponding to the list expression in table 6, and an output column of the computation process table is a basic expression corresponding to the grouping expression in table 6.

TABLE 7

| Step | Operation Instruction | Input | Operation | Output |
|------|----------------------|-------|-----------|--------|
| 1 | Field calculation | [T1] | [Description] Field calculation or attribute connection M [Keyword] List of connection fields # \| F11 # F12 # . . . , F21 # F22 # . . . , [List of calculation expressions ({*—normalized]FN1 = expr1, . . . (variable [@FSum])\|{normalized} KX_FieldCalculator(FID\| Bus08#Bus12#Car08#Car12\|JB = [F1]/[F2], JC = [F3]/[F4], P = [F1]/[F3]) | [TA1] TA1*shp |
| 2 | Field calculation | [T2] | [Description] Field calculation or attribute connection M [Keyword] List of connection fields # \| F11 # F12 # . . . , F21 # F22 # . . . , [List of calculation expressions ({*—normalized]FN1 = expr1, . . . (variable [@FSum])\|{normalized} KX_FieldCalculator(FID\| Bus08#Bus12#Car08#Car12\|JB = [F1]/[F2], JC = [F3]/[F4], P = [F1]/[F3]) | [TA2] TA2.shp |
| 3 | Field calculation | [T3] | [Description] Field calculation or attribute connection M [Keyword] List of connection fields # \| F11 # F12 # . . . , F21 # F22 # . . . , [List of calculation expressions ({*—normalized]FN1 = expr1, . . . (variable [@FSum])\|{normalized} KX_FieldCalculator(FID\| Bus08#Bus12#Car08# | [TA3] TA3*shp |
| 4 | Field calculation | [T4] | [Description] Field calculation or attribute connection M [Keyword] List of connection fields # \| F11 # F12 # . . . , F21 # F22 # . . . , [List of calculation expressions ({*—normalized]FN1 = expr1, . . . (variable [@FSum])\|{normalized} KX_FieldCalculator(FID\| Bus08#Bus12#Car08#Car12\|JB = [F1]/[F2], JC = [F3]/[F4], P = [F1]/[F3]) | [TA4] TA4*shp |

S12-2-4: when the type of the structured expression is a grouping mixed expression, expanding grouping items in the structured expression according to a corresponding rule, and keeping fixed terms in the structured expression unchanged to obtain the basic expression corresponding to the structured expression.

In the present embodiment, when the interpreter detects that the type of the structured expression is a grouping mixed expression, according to the structure characteristics of the grouping mixed expression, the grouping items in the structured expression are expanded according to the corresponding rule, and the fixed items in the structured expression are unchanged to obtain the basic expression corresponding to the structured expression.

Exemplarily, when one grouping mixed expression is "A[3;6;9]#@B[*]#C[*]", a basic expressions corresponding to the grouping mixed expression is: A3#B#C3# A6#B#C6#A9#B#C9.

B is the fixed item, the contents of which are kept unchanged after being expanded.

Referring to table 8, table 8 is a computation process table 4 proposed by an embodiment of the present disclosure. As shown in table 8, an input column in the computation process table is a fixed item, an output column in the computation process table is a grouping expression, and an operation column in the computation process table is a list expression. The basic expressions of the structured expression in the table are the basic expressions in the input, output and operation columns in table 2.

TABLE 8

| Step | Operation Instruction | Input | Operation | Output |
|------|----------------------|-------|-----------|--------|
| 1 | Acquire migration data | [@[1:4] Provinces and cities] | [Description] Acquire Baidu migration data [M] [Keywords] Name list of target province or city \| Date list\| Move in or out [in or out] List \| Target province or city identification [p or c]-KX BD_GetQx (Beijing \| 202201 {[24:27]} \| in \| province) | [Move in 202201 [24:27]] QR202201[*].csv |

Referring to table 9, table 9 is a computation process table 5 proposed by an embodiment of present disclosure. As shown in table 9, an input column in the table is a grouping mixed expression, and an output column in the table is a grouping expression.

TABLE 9

| Step | Operation Instruction | Input | Operation | Output |
|------|----------------------|-------|-----------|--------|
| 1 | Make thematic map | [@[1; 2; 3; 4] Research area] [@[*]Business center] [Spatial interpolation[*]] [@[*]TileMap] | [Description] Make thematic map M [Keywords:] List of alternate layer \| List of background layer \| Output resolution \| {Output template} \| {Range parameter # {Enlargement coefficient}} KX_Mapping (CJFW@Research scope *EndPT@, *R1G, *Map\|v zone boundary \| 200 \| 1 \| *) | [Thematic map [1:4]] Map[*].jpg |

Referring to table 10, table 10 is a computation process table 6 proposed by an embodiment of the present disclosure, wherein a basic expression in an input column is a basic expression corresponding to the grouping mixed expression in table 9, and a grouping expression in an output column is a basic expression corresponding to the grouping expression in table 9.

TABLE 10

| Step | Operation Instruction | Input | Operation | Output |
|---|---|---|---|---|
| 1 | Make thematic map | [Research area] [Business center] [Spatial interpolation1] [TileMap] | [Description] Make thematic map M [Keywords] List of alternate layer \| List of background layer \| Output resolution \| {Output template} \| {Range parameter # {Enlargement coefficient}} KX_Mapping (CJFW@ Research scope *EndPT@, *R1G, *Map\|v zone boundary \| 200 \| 1 \| *) | [Thematic map 1] Map1.jpg |
| 2 | Make thematic map | [Research area] [Business center] [Spatial interpolation2] [TileMap] | [Description] Make thematic map M [Keywords] List of alternate layer \| List of background layer \| Output resolution \| {Output template} \| {Range parameter # {Enlargement coefficient}} KX_Mapping (CJFW@Research scope *EndPT@, *R1G, *Map\|v zone boundary \| 200 \| 1 \| *) | [Thematic map 2] Map2.jpg |
| 3 | Make thematic map | [Research area] [Business center] [Spatial interpolation3] [TileMap] | [Description] Make thematic map M [Keywords] List of alternate layer \| List of background layer \| Output resolution \| {Output template} \| {Range parameter # {Enlargement coefficient}} KX_Mapping (CJFW@Research scope *EndPT@, *R1G, *Map\|v zone boundary \| 200 \| 1 \| *) | [Thematic map 3] Map3.jpg |
| 4 | Make thematic map | [Research area] [Business center] [Spatial interpolation4] [TileMap] | [Description] Make thematic map M [Keywords] List of alternate layer \| List of background layer \| Output resolution \| {Output template} \| {Range parameter # {Enlargement coefficient}} KX_Mapping (CJFW@Research scope *EndPT@, *R1G, *Map\|v zone boundary \| 200 \| 1 \| *) | [Thematic map 4] Map4.jpg |

An input column of table 10 contains three fixed items, which are [Research area], [Business center] and [TileMap], so the input column needs to be expressed by using the grouping mixed expressions.

S12-3: replacing the structured expression with the basic expression corresponding to the structured expression in the GeoComputation task parameters to obtain the task parameter containing the basic expression.

In the present embodiment, after the basic expression corresponding to the structured expression in the GeoComputation task parameter is obtained, the structured expression in the task parameter is replaced with an unstructured expression to obtain the task parameter containing the basic expression.

S13: executing a corresponding GeoComputation task according to the task parameter containing the basic expression to obtain a calculation result.

In the present embodiment, after the task parameter containing the basic expression is obtained, the corresponding GeoComputation task is executed according to the task parameter to obtain the calculation result.

In the present embodiment, the background reads the parameters in the input and control table to obtain the data needed for executing the GeoComputation task, and determines a task model and functions needed for computation by reading the parameters in a computation and process table, to obtain and display the calculation result of the GeoComputation.

Exemplarily, the GeoComputation task in table 10 is to make a thematic map, and the background expands and restores the task parameter containing the basic expression according to the contents in the computation process table, and executes the task of making the thematic map according to the obtained task parameter to obtain the needed thematic map.

In the embodiments of the present disclosure, a set of rules for constructing the structured expression based on the G language is specified. The user inputs the structured expression in a DAS document parameter list, and the background interpreter can expand and restore the structured expression into the corresponding basic expression. This way simplifies user input information, reduces user workload and error rate, reduces redundant information in the table, saves the table space. It is also easy for the user to understand the model and convenient for later modification and maintenance.

Figure 2:
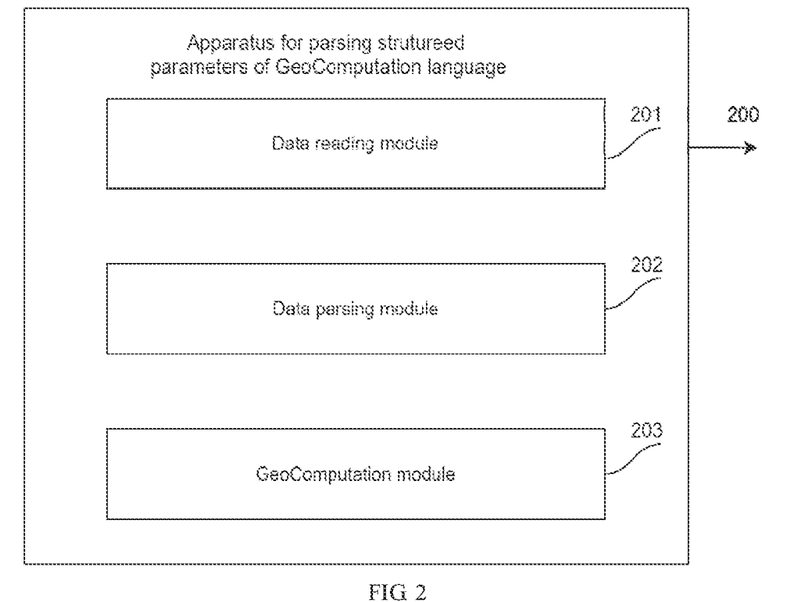
FIG. 2 is a schematic diagram of a structured parameter parsing apparatus for the GeoComputation language proposed in an embodiment of the present disclosure.

Based on the same inventive concept, an embodiment of the present disclosure provides a structured parameter parsing apparatus for the GeoComputation language. Referring to FIG. 2, FIG. 2 is a schematic diagram of the structured parameters parsing apparatus 200 for the GeoComputation language proposed by the embodiment of the present disclosure. As shown in FIG. 2, the apparatus includes:

a data reading module 201, configured for reading GeoComputation task parameters in a DAS document;

a data parsing module 202, configured for parsing a structured expression in the GeoComputation task parameters to obtain a task parameter containing a basic expression; and a GeoComputation module 203, configured for executing a corresponding GeoComputation task according to the task parameter containing the basic expression to obtain a calculation result.

Optionally, the data parsing module includes:

a structural type determining sub-module is configured for determining the structural type of the structured expression based on its expression structure;

an expression expanding sub-module is configured for expanding and restore the structured expression based on its structural type, and obtaining the basic expression corresponding to the structured expression;

a parameter obtaining sub-module is configured for replacing the structured expression with the corresponding basic expression in the GeoComputation task parameters, and obtaining the task parameters containing the basic expression.

Optionally, the structural type of the structured expression includes an enumeration expression, a list expression, a grouping expression, or a grouping mixed expression.

Optionally, the structural type determining sub-module includes:
  an enumeration expression determining sub-module, configured for, when that the expression structure of the structured expression is A[item1;item2; ... ]B, determining that a type of the structured expression is the enumeration expression, wherein A and B are character strings of a same part in the basic expression corresponding to the structured expression, and item1 and item2 represent numerical values or character strings in the basic expression corresponding to the structured expression;
  a list expression determining sub-module, configured for, when it is detected that the expression structure of the structured expression is A[item1:item2]B, determining that the type of the structured expression is a list expression, wherein A and B are character strings of the same part in the basic expression corresponding to the structured expression, and item1 and item2 represent numerical values in the basic expression corresponding to the structured expression;
  a grouping expression determining sub-module, configured for, when it is detected that a grouping identifier is present in the structured expression, determining that the type of the structured expression is the grouping expression, wherein the grouping expression is an expression in which the enumeration expression or the list expression is applied to all sub-items in the group through the grouping identifier; and
  a grouping mixed expression determining sub-module, configured for, when it is detected that the grouping expression and a fixed identifier are present in the structured expression, determining that the type of the structured expression is a grouping mixed expression, wherein the grouping mixed expression contains an expression of fixed sub-items in the grouping expression.

Optionally, the expression expanding sub-module includes:
  an enumeration expression expanding sub-module, configured for, when a type of the structured expression is an enumeration expression, expanding all sub-items displayed in the structured expression one by one to obtain the basic expression corresponding to the structured expression;
  a list expression expanding sub-module, configured for, when the type of the structured expression is a list expression, expanding all sub-items displayed in the structured expression and intermediate sub-items of all the sub-items one by one to obtain the basic expression corresponding to the structured expression;
  a grouping expression expanding sub-module, configured for, when the type of the structured expression is a grouping expression, expanding grouping items in the structured expression according to a corresponding rule, and replacing the grouping identifier in the structured expression with a corresponding sub-item to obtain the basic expression corresponding to the structured expression; and
  a grouping mixed expression expanding sub-module, configured for, when the type of the structured expression is a grouping mixed expression, expanding grouping items in the structured expression according to a corresponding rule, and keeping fixed sub-items in the structured expression unchanged to obtain the basic expression corresponding to the structured expression.

Based on the same inventive concept, another embodiment of the present disclosure provides a readable storage medium storing a computer program thereon, wherein the program, when executed by a processor, implements the steps of the method for parsing the structured parameters of the GeoComputation language described in any of the above embodiments of the present disclosure.

Based on the same inventive concept, another embodiment of the present disclosure provides an electronic device, including a memory, a processor and a computer program stored on the memory and being capable of running on the processor, wherein the processor, when executing, implements the steps of the method for parsing the structured parameters of the GeoComputation language described in any of the above embodiments of the present disclosure.

As for the device embodiment, since it is basically similar to the method embodiment, the description of the device embodiment is relatively simple. For relevant points, please refer to the partial description of the method embodiment.

The various embodiments in this specification are described in a progressive manner. Each embodiment focuses on the differences from the other embodiments, and the same or similar parts between the various embodiments may be referred to each other.

It should be appreciated by those skilled in the art that the embodiments of the present disclosure may be provided as methods, apparatuses or computer program products. Accordingly, the embodiments of the present disclosure can take the form of an entirely hardware embodiment, an entirely software embodiment, or a combination embodiment of software and hardware. Moreover, the embodiments of the present invention may take the form of a computer program product embodied on one or more computer usable storage media (including but not limited to disk storage, CD-ROM, optical storage, etc.) in which computer usable program codes are included.

The embodiments of the present disclosure are described with reference to the flow charts and/or block diagrams of the method, terminal device (system), and computer program products according to the embodiments of the present disclosure. It should be appreciated that each flow and/or block in the flow charts and/or block diagrams, and combinations of the flows and/or blocks in the flow charts and/or block diagrams can be implemented by computer program instructions. These computer program instructions may be provided to a general-purpose computer, a special purpose computer, an embedded processor, or a processor of other programmable data processing terminal device to produce a machine for the instructions executed by the computer or the processor of other programmable data processing terminal device to generate an apparatus for implementing the functions specified in one or more flows of the flow chart and/or in one or more blocks of the block diagram.

These computer program instructions may also be provided to a computer-readable memory that can guide the computer or other programmable data processing terminal device to work in a given manner, so that the instructions stored in the computer-readable memory generate a product including an instruction apparatus that implements the functions specified in one or more flows of the flow chart and/or in one or more blocks of the block diagram.

These computer program instructions may also be loaded to a computer, or other programmable terminal device, so that a series of operating steps are executed on the computer, or other programmable terminal device to produce processing implemented by the computer, so that the instructions executed in the computer or other programmable terminal device provide steps for implementing the functions specified in one or more flows of the flow chart and/or in one or more blocks of the block diagram.

Although the preferred embodiments of the present disclosure have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the present disclosure.

Finally, it should also be noted that relational terms herein such as first and second, etc., are used merely to distinguish one entity or operation from another entity or operation, and do not necessarily require or imply there is any such relationship or order between these entities or operations. Furthermore, the terms "including", "including" or any variations thereof are intended to embrace a non-exclusive inclusion, such that a process, method, article, or terminal device including a plurality of elements includes not only those elements but also includes other elements not expressly listed, or also includes elements inherent to such a process, method, article, or device. In the absence of further limitation, an element defined by the phrase "including a . . . " does not exclude the presence of additional identical element in the process, method, article, or terminal device.

The method and the apparatus for parsing the structured parameters of the GeoComputation language, the device and the medium provided by the present disclosure are described in detail above. Specific examples are applied to explain the principle and implementation of the present disclosure herein. The above embodiments are only configured to help understand the method of the present disclosure and the core idea thereof. Meanwhile, for those of ordinary skills in the art, there may be changes in the specific implementation and disclosure scope according to the idea of the present disclosure. To sum up, the contents of this specification should not be construed as limiting the present disclosure.

The invention claimed is:

1. A method for parsing structured parameters of a GeoComputation language, wherein the method comprises:
   reading GeoComputation task parameters in a DAS document;
   parsing a structured expression in the GeoComputation task parameters to obtain a task parameter containing a basic expression; and
   executing a corresponding GeoComputation task according to the task parameter containing the basic expression to obtain a calculation result.
   wherein the structural type of the structured expression comprises an enumeration expression, a list expression, a grouping expression, and a grouping mixed expression;
   when it is detected that the expression structure of the structured expression is A[item1; item2; . . . ]B, determining that a type of the structured expression is the enumeration expression, wherein A and B are character strings of a same part in the basic expression corresponding to the structured expression, and item1 and item2 represent numerical values in the basic expression corresponding to the structured expression;
   when it is detected that the expression structure of the structured expression is A[item1: item2]B, determining that the type of the structured expression is a list expression, wherein A and B are character strings of the same part in the basic expression corresponding to the structured expression, and item1 and item2 represent numerical values in the basic expression corresponding to the structured expression;
   when it is detected that a grouping identifier is present in the structured expression, determining that the type of the structured expression is the grouping expression, wherein the grouping expression is an expression in which the enumeration expression or the list expression is applied to all sub-items in the group through the grouping identifier; and
   when it is detected that the grouping expression and a fixed identifier are present in the structured expression, determining that the type of the structured expression is the grouping mixed expression, wherein the grouping mixed expression contains an expression of fixed sub-items in the grouping expression.

2. The method for parsing the structured parameters of the GeoComputation language according to claim 1, wherein parsing the structured expression in the GeoComputation task parameters to obtain the task parameter containing the basic expression comprises:
   determining a structural type of the structured expression according to an expression structure of the structured expression;
   expanding and restoring the structured expression according to the structural type of the structured expression to obtain a basic expression corresponding to the structured expression; and
   replacing the structured expression with the basic expression corresponding to the structured expression in the GeoComputation task parameters to obtain the task parameter containing the basic expression.

3. The method for parsing the structured parameters of the GeoComputation language according to claim 2, wherein expanding and restoring the structured expression according to the structural type of the structured expression to obtain the basic expression corresponding to the structured expression comprises:
   when a type of the structured expression is the enumeration expression, expanding all sub-items displayed in the structured expression one by one to obtain the basic expression corresponding to the structured expression;
   when the type of the structured expression is the list expression, expanding all sub-items displayed in the structured expression and intermediate sub-items of all the sub-items one by one to obtain the basic expression corresponding to the structured expression;
   when the type of the structured expression is the grouping expression, expanding grouping items in the structured expression according to a corresponding rule, and replacing the grouping identifier in the structured expression with a corresponding sub-item to obtain the basic expression corresponding to the structured expression; and
   when the type of the structured expression is the grouping mixed expression, expanding the grouping items in the structured expression according to a corresponding rule, and keeping fixed sub-items in the structured expression unchanged to obtain the basic expression corresponding to the structured expression.

4. A non-transitory computer-readable storage medium storing a computer program thereon, wherein the computer program, when executed by a processor, implements the steps of the method for parsing the structured parameters of the GeoComputation language according to claim 1.

5. An electronic device comprising a memory, a processor, and a computer program stored in the memory and being capable of running on the processor, wherein the processor, when executing the computer program, implements the steps of the method for parsing the structured parameters of the GeoComputation language according to claim 1.

* * * * *

UNITED STATES PATENT AND TRADEMARK OFFICE
CERTIFICATE OF CORRECTION

| | | |
|---|---|---|
| PATENT NO. | : 11,775,270 B1 | Page 1 of 1 |
| APPLICATION NO. | : 18/303018 | |
| DATED | : October 3, 2023 | |
| INVENTOR(S) | : Wensheng Zhou | |

It is certified that error appears in the above-identified patent and that said Letters Patent is hereby corrected as shown below:

On the Title Page

Column 1, Please insert Item (30), the Foreign Priority information:
--CHINA 202210498166.5 - Priority Date 05/09/2022--

Signed and Sealed this
Twenty-first Day of November, 2023

*Katherine Kelly Vidal*

Katherine Kelly Vidal
*Director of the United States Patent and Trademark Office*